United States Patent [19]

Heim et al.

[11] Patent Number: 5,494,973
[45] Date of Patent: Feb. 27, 1996

[54] PROCESS FOR THE PRODUCTION OF A CAST SHEET BASED ON THERMOPLASTIC RESIN

[75] Inventors: Philippe Heim, Verneuil-en-Halatte; Patrice Gaillard, Pau, both of France

[73] Assignee: Elf Atochem S.A., Paris, France

[21] Appl. No.: 370,237

[22] Filed: Jan. 9, 1995

Related U.S. Application Data

[63] Continuation of Ser. No. 155,247, Nov. 22, 1993, abandoned, which is a continuation of Ser. No. 630,910, Dec. 20, 1990, abandoned.

[30] Foreign Application Priority Data

Dec. 21, 1989 [FR] France .................. 89 16974

[51] Int. Cl.[6] ................. C08F 257/02; C08F 265/06
[52] U.S. Cl. .................. 525/305; 525/308; 525/309; 525/310
[58] Field of Search .................. 525/276, 304, 525/309, 317, 305, 308, 310

[56] References Cited

U.S. PATENT DOCUMENTS

| | | | |
|---|---|---|---|
| 3,018,266 | 1/1962 | Lundberg | 525/245 |
| 3,793,402 | 2/1974 | Owens . | |
| 4,927,867 | 5/1990 | Heim et al. | 525/267 |
| 4,952,635 | 8/1990 | Heim et al. . | |
| 5,082,879 | 1/1992 | Cutter et al. | 523/336 |
| 5,169,903 | 12/1992 | Toritani et al. | 525/310 |

FOREIGN PATENT DOCUMENTS

| | | |
|---|---|---|
| 0270865 | 6/1988 | European Pat. Off. . |
| 0279724 | 8/1988 | European Pat. Off. . |
| 0277874 | 8/1988 | European Pat. Off. . |
| 0297706 | 1/1989 | European Pat. Off. . |
| 0305272 | 3/1989 | European Pat. Off. . |
| 2159882 | 5/1973 | France . |

*Primary Examiner*—Vasu S. Jagannathan
*Attorney, Agent, or Firm*—Finnegan, Henderson, Farabow, Garrett & Dunner

[57] ABSTRACT

In a first step of this process an elastomer latex is prepared in aqueous emulsion in the presence of at least one ionic surfactant and at least one ethylenically unsaturated monomer; then in a second step at least one vinyl monomer, which is insoluble in water or sparingly soluble in water, is added to the latex thus obtained and the ionic charges introduced by the said latex are neutralised by adding to the mixture of latex and monomer at least one transfer agent carrying ionic charges opposite to those of the surfactant used in the first step, in order to effect the transfer of particles of the latex into the vinyl monomer; then in a third step the aqueous phase is separated from the organic phase comprising the latex and the vinyl monomer; and in a fourth step the bulk polymerisation of the organic phase is carried out in such a way as to obtain the cast sheet after cooling and release from the mould.

8 Claims, No Drawings

PROCESS FOR THE PRODUCTION OF A CAST SHEET BASED ON THERMOPLASTIC RESIN

This application is a continuation of application Ser. No. 08/155,247, filed Nov. 22, 1993, now abandoned, which is a continuation of application Ser. No. 07/630,910, filed Dec. 20, 1990, abandoned.

The present invention relates to a process for the production of a cast sheet based on an impact-resistant thermoplastic resin comprising a matrix and a reinforcing latex, this process comprising a step for the transfer, with the aid of ionic agents, of the particles of the reinforcing latex into the monomers of the matrix, followed by a step for bulk polymerisation of the latex and the monomers of the matrix. It also relates to the cast sheets obtained by this process.

Patent Application EP-A-0,297,706 describes a process for the production of a cast sheet based on an impact-resistant thermoplastic resin comprising at least 0.25% but less than 4% by weight of a latex of acrylic type in a matrix consisting mainly of methyl methacrylate, consisting, in a first step, in dispersing the latex having an elastomer core structure, in the form of coagulated, sprayed or frozen powder or in the form of granules, in the monomer or monomers of the matrix and then, in a second step, in polymerising the monomer or monomers, containing the dispersed latex, between two plates. However, this method requires very long times for the step for dissolution of the latex in the monomer or monomers of the matrix and also requires the availability of flocculated and dried latex, the particles of which necessarily comprise a shell of poly(methyl methacrylate).

In order to overcome these disadvantages, research has been carried out to provide a process for the production of cast sheets based on impact-resistant thermoplastic resin modified by an elastomer latex capable of not comprising a poly(methyl methacrylate) shell, the said process being based on the principle of the technique for phase transfer of an aqueous latex, as described in Patent Application EP-A-0,305,272, thus enabling a solution of matrix monomer or monomers, containing the latex, to be obtained economically and rapidly, which solution it then suffices to polymerise by a casting technique.

The process which is the subject of the present invention and leads to the production of a cast sheet based on impact-resistant thermoplastic resin, modified by an elastomer latex, comprises the following sequence of steps:

(a) in a first step an elastomer latex is prepared in aqueous emulsion in the presence of at least one ionic surfactant and at least one ethylenically unsaturated monomer; then
(b) in a second step at least one vinyl monomer, which is insoluble in water or sparingly soluble in water, is added to the latex thus obtained and the ionic charges introduced by the said latex are neutralized by adding to the mixture of latex and vinyl monomer at least one transfer agent carrying ionic charges opposite to those of the surfactant used in step (a), in order to effect the transfer of particles of the latex into the vinyl monomer; then
(c) in a third step the aqueous phase is separated from the organic phase comprising the latex and the vinyl monomer; and finally
(d) in a fourth step the bulk polymerisation of the organic phase is carried out in such a way as to obtain the cast sheet after cooling and release from the mould.

In the particular embodiments according to the invention, the ethylenically unsaturated monomer in step (a) is preferably chosen from dienes, substituted dienes, alkyl acrylates, aralkyl acrylates and olefines. More particularly, amongst the conjugated dienes which fall under the definition of this ethylenically unsaturated monomer, the following may be mentioned: isoprene, chloroprene, 2,3-dimethyl butadiene and 1,3-butadiene. Amongst the alkyl acrylates which fall under the abovementioned definition, those which may be mentioned are those which have $C_1$–$C_{15}$, advantageously $C_1$–$C_8$, and preferably $C_2$–$C_8$ alkyl groups. In particular, the following may be mentioned: n-butyl acrylate, ethyl acrylate, 2-ethylhexyl acrylate and isobutyl acrylate. Alkyl acrylates in which the alkyl groups have a longer chain could also be used. Amongst the aralkyl acrylates which fall under the abovementioned definition, those which may be mentioned are those in which the cyclic part contains 5, 6 or 7 carbon atoms, with or without a supplementary alkyl bridge, and the alkyl part contains up to 15 carbon atoms. This list of acrylates also encompasses the substituted acrylates, such as the alkylthioalkyl acrylates (for example ethylthioethyl acrylate) and the alcoxyalkyl acrylates (for example methoxyethyl acrylate).

The vinyl monomer added to the latex in step (b) is preferably chosen from alkyl methacrylates in which the alkyl group comprises from 1 to 4 carbon atoms, vinyl aromatic hydrocarbons, acrylonitrile, methacrylonitrile and vinyl halides. The following may be mentioned as the main monomer falling under the definition of this vinyl monomer; methyl methacrylate, which is preferred, ethyl methacrylate, isopropyl methacrylate, n-butyl methacrylate, sec-butyl methacrylate, tert-butyl methacrylate, styrene, α-methylstyrene, monochlorostyrene, tert-butylstyrene, vinyltoluene, etc.

Generally the amount of vinyl monomer is chosen such that the cast sheet produced contains from 0.5% to 20% by weight of elastomer latex and from 99.5% to 80% by weight of the said vinyl monomer. Preferably, the cast sheet produced will contain from 2% to 7% by weight of elastomer latex and from 98% to 93% by weight of vinyl monomer. For this reason, it is surprising to find that such low elastomer latex contents are able to confer excellent impact strength properties while in general at least 20% by weight of elastomer latex is used in the case of impact-resistant materials obtained by compounding.

Various embodiments of each of the steps of the process which has just been defined under its most general aspect will now be described. With regard to steps (a) and (b), and more precisely with regard to the choice of surfactant, the choice of transfer agent, the method of preparation of the latex and the method for transfer of the said latex into the vinyl monomer added during step (b), reference will be made to Patent Application EP-A-0,305,272, the description of which will be incorporated here by way of reference. In this context, it will be noted that step (a) may be followed by a complementary step (a1) consisting in an emulsion polymerisation, with the latex obtained in step (a), of at least one vinyl monomer, known as compatibilisation monomer, belonging to the family of monomers introduced in step (b). In this step (a1) from 99 to 15 parts by weight of the solid part of the said latex and from 1 to 85 parts by weight of the said compatibilisation monomer or monomers are advantageously used per 100 parts by weight of the mixture formed by the latex and the compatibilisation monomer or monomers.

The possible morphologies of the latex used in the process according to the invention are not restricted to the elastomer type (termed "flexible") and the elastomer/non-elastomer type (termed "flexible/rigid") described above, but may also be extended to more complex morphologies including, in particular, those of the type termed "rigid/flexible/rigid" described in FR-A-2,159,882, those of the non-crosslinked elastomer/crosslinked elastomer/non-elastomer type described in EP-A-0,277,874, or those described in EP-A-0,279,724 and EP-A-270,865.

With regard to step (b) of the process according to the invention, that is to say the step for transfer of the particles of latex obtained in the preceding step into the vinyl monomer, a mixture is generally used which comprises, per 100 parts by weight, at least 50 parts by weight and at most 90 parts by weight of the aqueous phase containing the latex obtained at the end of step (a) or (a1) and at most 50 parts by weight and at least 10 parts by weight of the vinyl monomer. The transfer generally takes place at a temperature ranging from 0° C. to 90° C. approximately.

During step (c) of the process according to the invention, the organic phase comprising the latex and the vinyl monomer is separated from the aqueous phase, this operation taking place, for example, either by settling or by centrifuging, depending on the latex contents expressed as percentages by weight relative to the organic phase; thus, for latex contents of below about 6% a simple settling for one to two hours suffices to separate the phases, it being possible to facilitate this settling by the addition, after the transfer, of an aqueous electrolyte solution (which may be aluminium sulphate for example); in contrast, for latex contents higher than about 6% (case where the viscosity of the phase consisting of the vinyl monomer becomes too high) it becomes desirable to centrifuge in order to separate the phases well and extract all of the water occluded in the phase formed by the latex and the vinyl monomer. It is desirable, at this stage, to remove all traces of microdrops of water in order to prevent turbid sheets being obtained. It will be noted, moreover, that the viscosity of the monomer phase containing the latex depends not only on the latex content but also on the swelling index of the latex particles in the vinyl monomer and consequently on the degree of crosslinking of the elastomer.

Step (d) of the process according to the invention is the bulk polymerisation between two plates of a mould which is able to withstand the maximum temperature of the reaction mixture and is non-reactive or insoluble in contact with the liquid charge. The mould used is generally made of an inorganic glass; however, it can be advantageous, in order to prevent photocatalysis of the polymerisation of one of the monomers present, to use a mould made from substances such as, for example, polyethylene, polypropylene, polyethylene terephthalate, silicone elastomers and metals such as, for example, aluminium, copper, nickel or alloys such as brass or stainless steel. A metal mould will be more particularly suitable when the process according to the invention is carried out continuously, for example in an installation of the rolling mill type. This polymerisation step takes place under known operating conditions, in particular:
with regard to the pressure, a pressure equal to atmospheric pressure or a pressure which can reach up to about 5 bars, or a reduced pressure of down to about 0.35 bar.
with regard to the temperature, this may be chosen in a range from 35° C. to 135° C. approximately when the pressure is atmospheric pressure. The temperature of the mould could be increased progressively, for example by plateaus, within this range. More generally, it could be advantageous to provide a temperature programme which is non-uniform with time, that is to say comprising several steps of different duration and carried out at different temperatures.
with regard to the duration, a total duration of preferably between 2 and 120 hours approximately (under atmospheric pressure) for cast sheets having a thickness of up to 50 mm.

Moreover, in order to facilitate the release from the mould at the end of the process, it is particularly recommended to introduce an effective amount of at least one mould-release agent such as, for example, sodium dioctylsulphosuccinate into the reaction mixture.

The process according to the present invention allows the production of cast sheets which have an improved impact strength, are transparent and have a thickness of between 1.5 and 50 mm approximately.

The following non-limiting examples are given in order better to illustrate the subject of the invention.

EXAMPLE 1

This example relates to the preparation of a cast sheet of poly(methyl methacrylate) containing 5% by weight of a reinforcing latex of the flexible/rigid type.

a) Synthesis of the flexible/rigid latex

Table 1 below gives the compositions in parts by weight of the solutions A, B, C, D, E and F used in the synthesis of this latex.

TABLE 1

| Component | Solution | | | | | |
|---|---|---|---|---|---|---|
| | A | B | C | D | E | F |
| Water | 2700 | 80 | — | 350 | 350 | — |
| Sodium dodecylbenzene sulphonate | 8.32 | — | — | 2.1 | — | — |
| Sodium carbonate | 5.4 | — | — | — | — | — |
| n-Butyl acrylate | — | — | 824.4 | — | — | — |
| Styrene | — | — | 168.8 | — | — | — |
| Ethylene glycol dimethacrylate | — | — | 41.6 | — | — | — |
| Allyl methacrylate | — | — | 5.2 | — | — | — |
| Potassium persulphate | — | 4.16 | — | — | 1.55 | — |
| Ethyl acrylate | — | — | — | — | — | 22.4 |
| Methyl methacrylate | — | — | — | — | — | 534.5 |
| Tert-dodecyl mercaptan | — | — | — | — | — | 2.2 |

Solution A is heated to 85° C. in a double-walled glass reactor provided with a condenser, nitrogen flushing and a stirrer. When solution A reaches the temperature of 85° C., solution B is added and solution C is then run in continuously in the course of 4 hours and 30 minutes. When all of the solution has been run in, the "flexible" latex is baked for 2 hours at 85° C., after adding solution D. Solution E is then added and solution F is then added continuously in the course of 2 hours, keeping the temperature of the mixture at 85° C. throughout, and the synthesis of the latex is ended by baking at 85° C. for 1 hour.

The degree of conversion achieved is 99.3%.

The proportion of solid, which corresponds to the ratio of the mass of dry latex to the mass of aqueous latex multiplied by 100, is 31.5%.

The particles consisting of flexible core alone have a size of 67 nm and the final particles of the "flexible/hard" latex have a size of 78 nm.

b) Transfer of the latex into methyl methacrylate 21 ml of a $10^{-2}$M aqueous dodecyltrimethylammonium chloride solution are added, with vigorous stirring and at ambient temperature, to a mixture consisting of 800 g of water, 33.6 g of the aqueous latex obtained in the preceding step (10 g solid portion) and 200 g of non-stabilised methyl methacrylate. The final 2 ml are added slowly in order to obtain with precision the critical volume ensuring instantaneous and total transfer of the latex particles from the aqueous phase into the methyl methacrylate. Stirring is then stopped and the mixture is centrifuged and decanted in order to obtain a methyl methacrylate phase containing 5% by weight of latex, which is free from microdroplets of water and has a viscosity of close to 2 cP. 0.02 g of azodiisobutyronitrile, equivalent to 100 ppm, is then added.

c) Production of the cast sheets

The mixture of monomers containing 5% of latex, obtained in the preceding step, is degassed and then cast between two glass plates 3.8 mm apart provided with a poly(vinyl chloride) retaining strip. The mixture is then polymerised at 48° C. for 24 hours and then at 115° C. for 1 hour.

The properties measured are:
the modulus of elasticity under tension determined by ASTM method D 638
the non-notched Charpy impact strength (spacing 40 mm) determined by ISO method 179,
the Vicat B temperature determined by NFT method 51 021, and
the light transmission (thickness 3 mm) determined by ASTM method D 1003 and the results obtained are collated in Table 2 below.

EXAMPLE 2 (comparative)

This example relates to the preparation of a cast sheet of poly(methyl methacrylate) not containing reinforcing latex. The production process used is identical to that described in Example 1 and the properties measured are determined by the methods defined in Example 1; the results obtained are collated in Table 2 below.

TABLE 2

| Properties | Example 1 | Example 2 |
|---|---|---|
| Modulus of elasticity under tension (MPa) | 2 900 | 3 300 |
| Non-notched Charpy impact strength (KJ/m$^2$) | 20 | 10 |
| Vicat B (°C.) | 113 | 113 |
| Light transmission (%) | 92.5 | 92.5 |

EXAMPLES 3 AND 4

These examples relate to the preparation of cast sheets of poly(methyl methacrylate) containing, respectively, 5% and 3% by weight of reinforcing latex of the "flexible" type.

a) Synthesis of the "flexible" latex without a hard shell

Table 3 below gives the compositions, expressed as parts by weight, of the solutions A, B and C used for the synthesis of this latex.

TABLE 3

| | Solution | | |
|---|---|---|---|
| Component | A | B | C |
| Water | 3800 | 100 | — |
| Lauric acid | 2.44 | — | — |
| Sodium hydroxide | 2.44 | — | — |
| Potassium persulphate | — | 4.9 | — |
| n-Butyl acrylate | — | — | 984.7 |

TABLE 3-continued

| | Solution | | |
|---|---|---|---|
| Component | A | B | C |
| Styrene | — | — | 231.7 |
| Ethylene dimethacrylate | — | — | 6.2 |
| Glycol | — | — | |
| Allyl methacrylate | — | — | 6.2 |

The method is identical to that described in Example 1, but simplified by the fact that there is not a core/shell structure. The characteristics of the latex thus obtained are as follows:

diameter of the particles: 173 nm
solids content: 24.1%
pH: 6.5
swelling index in methyl methacrylate: 10 b) Transfer of the latex into the methyl methacrylate

The method is identical to that described in Example 1. The methyl methacrylate solution obtained at the end of this step contains 5% by weight of the latex obtained in the preceding step (Example 3); this solution is then diluted in order to obtain a supplementary methyl methacrylate solution containing 3% by weight of latex (Example 4).

c) Production of cast sheets

The process used is identical to that described in Example 1 and the properties measured for the two types of cast sheets obtained (reinforced with 3% of latex and 5% of latex respectively) are determined by the methods defined in Example 1; the results obtained are collated in Table 4 below.

TABLE 4

| | Examples | |
|---|---|---|
| Properties | 3 | 4 |
| Modulus of elasticity under tension (MPa) | 3 100 | 2 900 |
| Non-notched Charpy impact strength (KJ/m$^2$) | 17.3 | 20.1 |
| Vicat B (°C.) | 113 | 113 |
| Light transmission (%) | 92.5 | 92.5 |

We claim:
1. A process for the production of a transparent cast sheet of an impact-resistant thermoplastic resin modified with an elastomer latex, which comprises:
   (a) preparing an elastomer latex in an aqueous emulsion in the presence of an ethylenically unsaturated monomer and an ionic surfactant;
   (b) adding a vinyl monomer to the elastomer latex of step (a), said vinyl monomer being insoluble or sparingly soluble in water, and adding a transfer agent having a charge opposite to that of said ionic surfactant of step (a) to transfer the particles of said elastomer latex into said vinyl monomer;
   (c) separating the aqueous phase from the organic phase containing said elastomer latex and said vinyl monomer; and
   (d) bulk polymerizing said organic phase in a mold to form a transparent cast sheet, wherein the amount of said vinyl monomer is selected such that the cast sheet contains from 2% to 7% by weight of said elastomeric latex and from 98% to 93% by weight of said vinyl monomer.

2. The process of claim 1, further comprising step (a1) emulsion polymerising the mixture of step (a) with a compatibilization vinyl monomer which is insoluble in water or sparingly insoluble in water.

3. The process of claim 2, wherein 99 to 15 parts by weight of the solid part of said elastomeric latex and 1 to 85 parts by weight of said compatibilization vinyl monomer is used per 100 parts by weight of the mixture formed by said elastomeric latex and said compatibilization vinyl monomer.

4. The process of claim 1, wherein step (b) is carried out at a temperature of between 0° C. to 90° C.

5. The process of claim 1, wherein at step (d) said mold is subjected to a pressure of between 0.35 bar and 5 bars.

6. The process of claim 1, wherein at step (d) the mold is subjected to a temperature of between 35° C. and 135° C.

7. The process of claim 1, wherein at step (d) the mold is subjected to temperature which is non-uniform with time.

8. The process of claim 1, wherein at step (d) the mold is subjected to pressure and temperature conditions for a time period of between 2 and 120 hours.

* * * * *